Jan. 26, 1932.  B. F. DEAN  1,843,021
POULTRY WATERING APPARATUS
Filed May 3, 1930  4 Sheets-Sheet 1
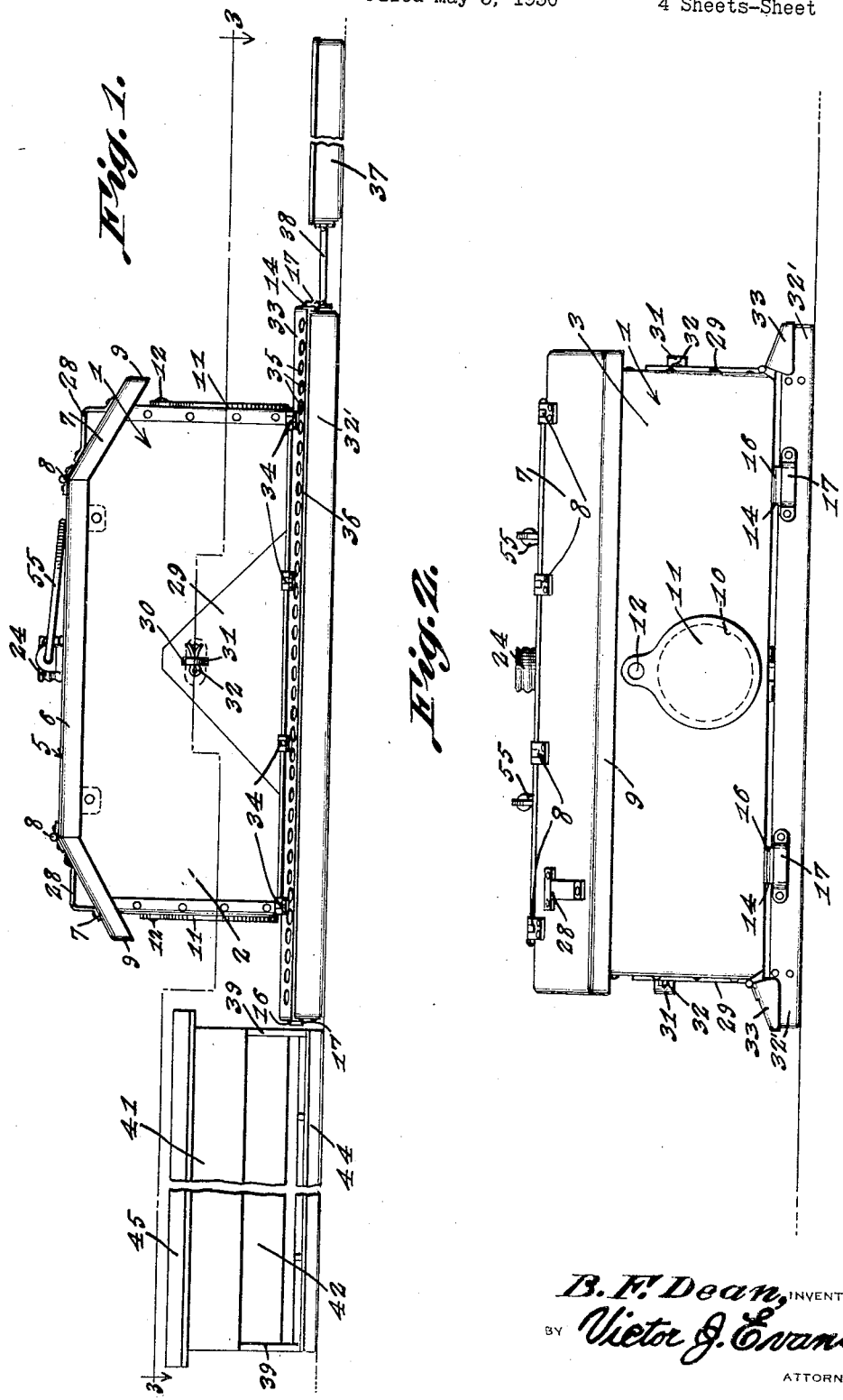
B. F. Dean, INVENTOR
BY Victor J. Evans
ATTORNEY

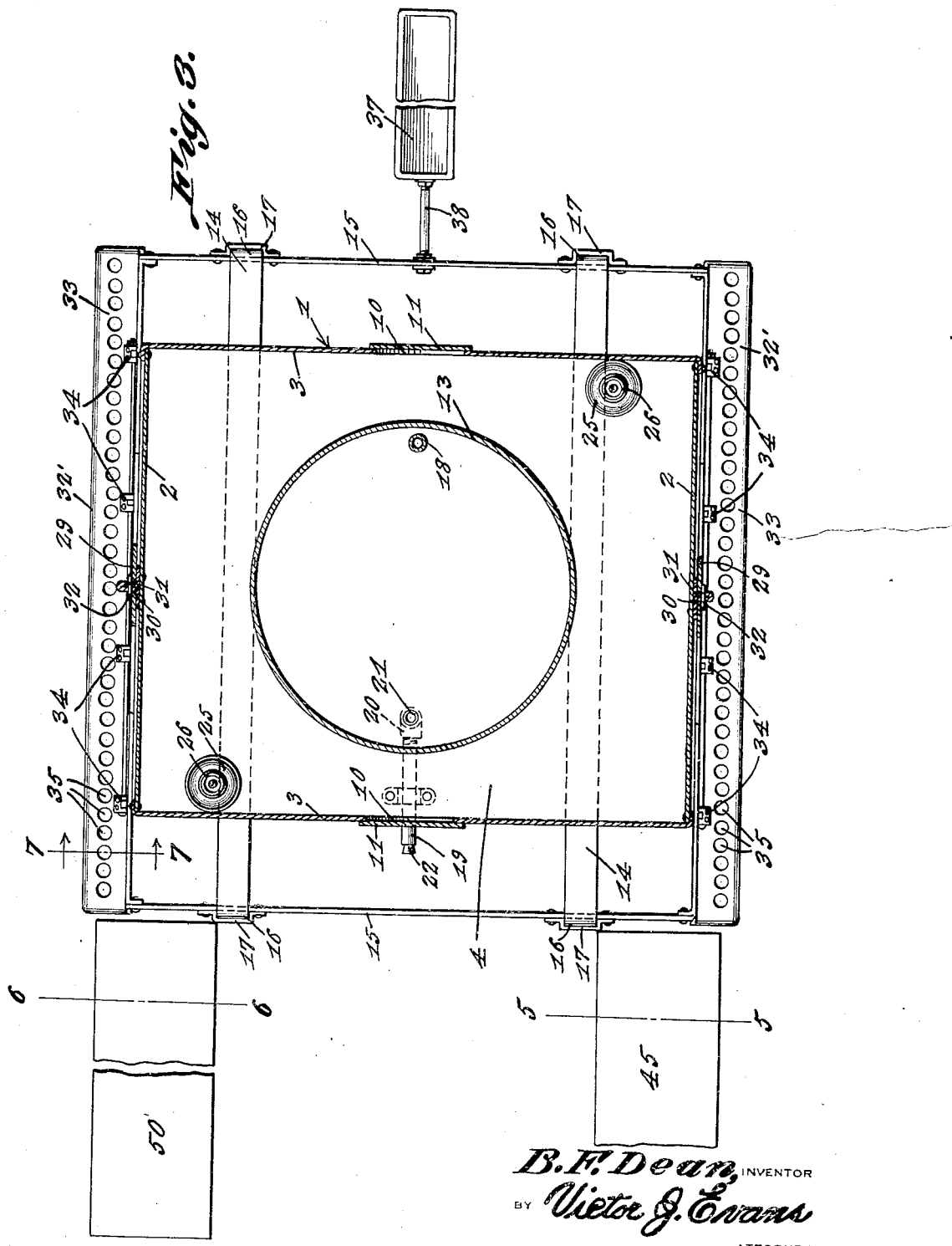

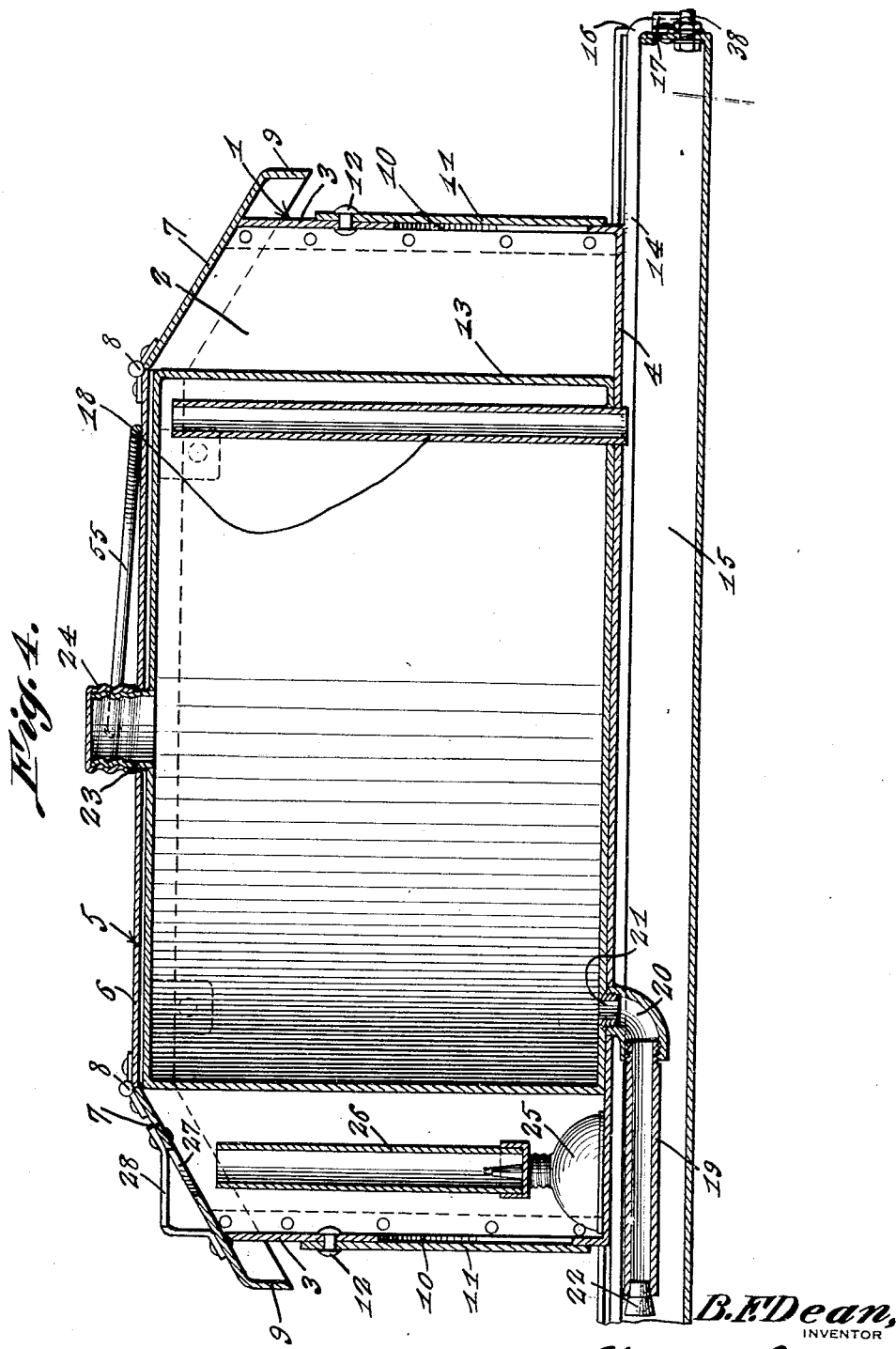

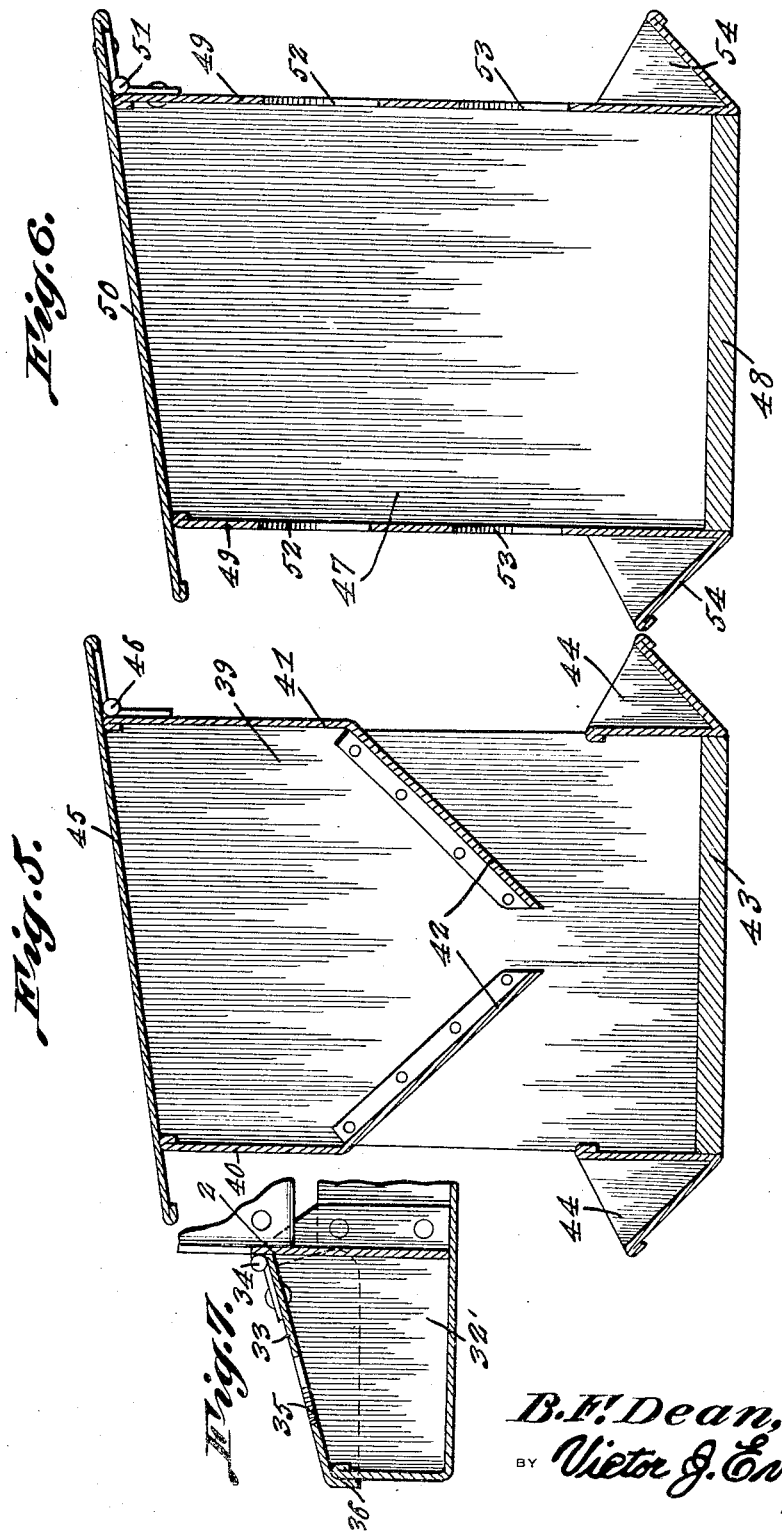

Patented Jan. 26, 1932

1,843,021

UNITED STATES PATENT OFFICE

BENJAMAN F. DEAN, OF STURGIS, KENTUCKY, ASSIGNOR OF ONE-HALF TO MASON D. WEST, OF STURGIS, KENTUCKY

POULTRY WATERING APPARATUS

Application filed May 3, 1930. Serial No. 449,544.

This invention relates to an apparatus for watering poultry and has as its general object to provide an apparatus which will greatly lessen the time and labor expended to the ordinary methods of watering poultry.

Another object of the invention is to provide, in an apparatus of this class, means whereby water to be supplied to poultry may be heated.

Another object of the invention is to provide, in an apparatus of this class, a novel arrangement of heating units and a water storage tank so arranged with respect to the heating units as to provide for proper heating of the water, the invention also contemplating means for ventilating the water heating chamber.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 1 is a view in side elevation of the apparatus embodying the invention.

Figure 2 is a view in end elevation illustrating the main unit of the apparatus.

Figure 3 is a horizontal sectional view taken substantially on the line 3—3 of Figure 1 looking in the direction indicated by the arrows.

Figure 4 is a transverse sectional view through the heating compartment and the parts associated therewith.

Figure 5 is a vertical transverse sectional view on the line 5—5 of Figure 3 illustrating a unit for feeding grain and the like to the poultry.

Figure 6 is a similar view on the line 6—6 of Figure 3 illustrating another feeding unit.

Figure 7 is a detail vertical transverse sectional view on the line 7—7 of Figure 3 looking in the direction indicated by the arrows and showing means whereby buttermilk may be fed to the fowls.

In the drawings the heating chamber of the apparatus is indicated in general by the numeral 1 and this chamber will be constructed of sheet metal and is of the hollow rectangular form shown in Figures 3 and 4 of the drawings, the heating chamber including side walls 2 and front and rear walls 3, a bottom 4, and a top 5, the top preferably consisting of a main section 6 and side sections 7 which are hinged as indicated by the numeral 8 to the opposite sides of the main top section 6 and which sections 7 are adapted to be swung vertically about their hinges so as to assume either the closed position shown in Figure 4 or an elevated position resting upon the main section 6 of the said top 5. The side walls are preferably inclined from the sides of the top wall at which the sections 7 are hinged so that the said sections 7 will be downwardly inclined when in closed position and these sections are provided with depending flanges 9 which prevent the entrance of rain and snow into the said heating chamber. In order that access may be had to the interior of the heating chamber for the purpose of lighting small heating members, to be hereinafter described, openings 10 are formed in the front and rear walls of the said chamber and closure plates 11 of circular form are swivelled as at 12 upon these walls and normally assume a position closing the openings. The numeral 13 indicates in general the water tank of the apparatus and this tank is of the cylindrical form shown in Figures 3 and 4 of the drawings and is disposed to rest at its bottom upon the bottom 4 of the heating chamber, the top of the tank engaging beneath the top section 6 of the top of the heating chamber.

The bottom of the heating chamber is supported upon cross beams 14 which are disposed to rest upon the end walls of a trough 15 which is of rectangular form, the ends of these cross beams are turned downwardly at right angles as at 16 to seat in U-shaped straps 17 which are secured upon the outer side of each end wall of the trough. The numeral 18 indicates a ventilating pipe which is mounted at its lower end in openings in the bottom of the tank 13 and bottom 4 of the heating chamber, the lower end of this pipe being disposed above the trough 15 and the upper end terminating immediately below the top of the tank. An outlet pipe 19 is connected by an elbow 20 with a nipple 21 at the bottom of the tank 13 and extends horizontally within the trough 15, and a plug 22 is removably fitted into the delivery end of this pipe. A filling spout 23 is installed in the central portion of the tank 13 and in the top section 6 of the heating chamber and a closure cap 24 is removably fitted to this spout and at this point it will be understood that water may be introduced into the tank to substantially fill the same while the plug 22 closes the delivery end of the pipe 19. When the tank has been practically filled with water, the plug may be removed until the trough has been filled nearly to the top, whereupon the plug is again fitted into the delivery end of the pipe 19.

The heating means for the tank 13 is in the form of two oil burning stoves 25 and these stoves are arranged in opposite corners of the heating chamber and therefore at diametrically opposite sides of the tank 13. Fitted to each oil burner is a flue pipe 26 which extends upwardly and terminates at its upper end beneath the opening 27 which is formed in the respective section 7 of the top of the heating chamber. From the foregoing it will be evident that the heating units in the heating chamber will supply sufficient heat to heat the water in the tank 13 and therefore the water supply to the poultry will be at a suitable temperature. In order to prevent water or snow entering the flues 26, a baffle 28 is arranged above each opening 27, upon the respective top section 7 as most clearly shown in Figure 4 of the drawings. In order that the heating chamber may be held stationary with respect to the trough 15 and upon the cross beams 14, a wing 29 is mounted at the inner side of the lower portion of each side wall of the trough 15 and extends upwardly beside the corresponding side wall 2 of the heating chamber 1 and each wing is formed with a slot 30, and a lug 31 is mounted upon each of the said side walls and is engageable through these slots when the wings are slightly sprung outwardly, a pin 32 is fitted through an opening in each of the lugs 31 so as to connect the side walls of the heating chamber with the side walls of the trough and thus prevent displacement of these parts. Extending at each side of the heating chamber is a trough 32', the open top of which is inclined downwardly, and a cover 33 is hingedly mounted at its rear side as at 34 upon the respective side wall 2 of the heating chamber and is adapted to extend over and close the top of the trough 32' except that this cover is formed at intervals in its length with openings 35 through which fowls may gain access to the trough to consume buttermilk which is contained therein.

Flanges 36 are formed upon the cover 35 and extend downwardly from the longitudinal free edge thereof and form the ends of the cover so as to exclude dust from the interior of each trough. In addition to the trough 15 there is provided an auxliary trough 37 and a supply pipe 38 connects one end of this trough with one end of the trough 15.

As before stated, Figures 5 and 6 illustrate auxiliary feeding units and in the embodiment of the invention shown in Figure 5, the numeral 39 indicates the side walls of a hopper which includes also front and rear walls 40 and 41, respectively. The hopper further includes inclined bottom walls 42 which extend between the side walls 39 and between the lower, spaced ends of which, feed deposited in the hopper may be delivered onto the bottom 43 of the unit, which bottom extends between the side walls 39. Troughs 44 are positoned at opposite sides of the bottom 43 and the feed which is delivered into the intermediate trough which is formed by the walls of the trough 44 and the said bottom 43 may be transferred by an attendant of the apparatus into the troughs 44. A cover 45 is hingedly mounted as at 46 at the upper side of the open top of the unit and normally rests in the closed position shown in Figure 5.

The smaller fowls may partake of the feed which is deposited in the troughs 44 and 54 and the larger fowls partake of the feed deposited upon the bottom walls 43 and 48 of the respective feeding unit.

Figure 6 indicates a slightly different feeding unit and in this figure the side walls of the unit are indicated by the numeral 47 and the bottom by the numeral 48, the front and rear walls being indicated by the numeral 49 and a closure 50 being hinged as at 51 at the upper end of one of the walls 49 to normally seat in position closing the top of the unit.

This above mentioned unit is formed with upper and lower openings 52 and 53 in the walls 49, and the upper openings are for poultry of larger size and the lower openings for poultry of smaller size. A handle 55 is preferably mounted pivotally upon the top of the heating chamber so that the apparatus may be readily lifted and carried from place to place.

What I claim is:—

1. In poultry feeding apparatus of the class described, a heating chamber, the said chamber having a top including a fixed main section and sections hinged to the opposite sides of the main section, a trough beneath the chamber, bars mounted upon the trough and supporting the chamber, a tank within the chamber, a filling spout extending from the top of the tank and through the main section of the top, and a closure for the spout, means for delivering water from the tank to the trough, a watering trough exteriorly of the chamber, means for conducting water from the first mentioned trough to the last mentioned trough, and a heating unit in the heating chamber in juxtaposition to the said tank.

2. In poultry feeding apparatus of the class described, a heating chamber, a trough beneath the chamber, socket members upon the end walls of the trough, cross bars extending between said walls and having end portions extending downwardly and seated in the socket members, the said bars supporting the heating chamber, a tank within the chamber, means for delivering water from the tank to the trough, a watering trough exteriorly of the chamber, means for conducting water from the first mentioned trough to the last mentioned trough, and a heating unit in the heating chamber in juxtaposition to the said tank.

In testimony whereof I affix my signature.

BENJAMAN F. DEAN.